(12) United States Patent
Pascucilla (10) Patent No.: US 11,649,031 B2
(45) Date of Patent: May 16, 2023

(54) SYSTEMS AND METHODS FOR SOLAR-ELECTRIC PUMP-OUT BOAT

(71) Applicant: East Shore District Health Department, Branford, CT (US)

(72) Inventor: Michael A. Pascucilla, Guilford, CT (US)

(73) Assignee: East Shore District Health Department, Branford, CT (US)

(*) Notice: Subject to any disclaimer, the term of this patent is extended or adjusted under 35 U.S.C. 154(b) by 349 days.

(21) Appl. No.: 17/077,151

(22) Filed: Oct. 22, 2020

(65) Prior Publication Data

US 2021/0371073 A1    Dec. 2, 2021

Related U.S. Application Data (60) Provisional application No. 63/030,012, filed on May 26, 2020.

(51) Int. Cl.
| | | |
|---|---|---|
| *B63J 4/00* | (2006.01) | |
| *B63H 21/17* | (2006.01) | |
| *B63B 29/16* | (2006.01) | |
| *B63B 17/02* | (2006.01) | |

(52) U.S. Cl.
CPC ............... *B63J 4/006* (2013.01); *B63B 17/02* (2013.01); *B63B 29/16* (2013.01); *B63H 21/17* (2013.01); *B63B 2017/026* (2013.01); *B63H 2021/171* (2013.01)

(58) Field of Classification Search
CPC ....... B63B 17/00; B63B 17/02; B63B 17/023; B63B 2017/026; B63B 29/14; B63B 2029/145; B63B 29/16; B63H 21/17; B63H 2021/171; B63J 3/04; B63J 4/006;
(Continued)

(56) References Cited

U.S. PATENT DOCUMENTS

| 4,324,007 A * | 4/1982 | Morris ...................... E03D 5/00 4/321 |
| 5,331,911 A * | 7/1994 | Bost .......................... B63J 4/004 114/211 |

(Continued)

FOREIGN PATENT DOCUMENTS

DE    202020005132 U1 *    3/2021    ............... B63B 1/12

*Primary Examiner* — Ajay Vasudeva
(74) *Attorney, Agent, or Firm* — Brian J. Colandreo; Michael T. Abramson; Holland & Knight LLP (57) ABSTRACT

A solar electric pump-out boat for removing human waste. The pump-out boat may include a boat hull, wherein the boat hull may include a bow, a stern, and a self-draining sole disposed therein. The pump-out boat may further include a holding tank disposed within the hull underneath the self-draining sole for collecting waste. The pump-out boat may further include a console disposed approximately center of, and on a top surface of the self-draining sole. The pump-out boat may further include a solar panel for absorbing sunlight to convert into electrical power. The pump-out boat may further include a pump disposed within the console. The pump-out boat may further include a battery connected to a motor, the pump, and the solar panel, such that the solar panel charges the battery to provide the electrical power to operate the pump and the motor.

11 Claims, 5 Drawing Sheets

(58) Field of Classification Search
CPC .......... C02F 2103/008; C02F 2201/008; C02F 2201/009
See application file for complete search history.

(56) References Cited

U.S. PATENT DOCUMENTS 9,919,784 B1* 3/2018 Fisher .................... B63H 21/17
10,875,608 B2* 12/2020 Borton .................... B60L 8/003

* cited by examiner

SYSTEMS AND METHODS FOR SOLAR-ELECTRIC PUMP-OUT BOAT

RELATED CASES

This application claims the benefit of U.S. Provisional Application No. 63/030,012, filed on 26 May 2020, the contents of which are all incorporated by reference.

GOVERNMENT FUNDING

This invention was made with government support under the Clean Vessel Act Grant Program Agreement, Identification Number 2017-190 awarded by Federal Clean Vessel Act Grant Program Agreement, Identification Number 2017-190. The government has certain rights in the invention.

BACKGROUND

Generally, environmental regulations, such as *Conn. Gen. Stat.* § 15-175, may require, e.g., boat owners, to dispose of human waste collected within their hulls in a manner that is up to code and environmentally conscious. This helps prevent the dumping of such waste and sewage into waterways.

BRIEF SUMMARY OF DISCLOSURE

In one example implementation, a solar electric pump-out boat for removing human waste may include, but is not limited to a boat hull, wherein the boat hull may include a bow, a stern, and a self-draining sole disposed therein. The pump-out boat may further include at least one outboard motor disposed on the stern for powering movement of the pump-out boat. The pump-out boat may further include a holding tank disposed within the hull underneath the self-draining sole for collecting waste. The pump-out boat may further include a console disposed approximately center of, and on a top surface of the self-draining sole. The pump-out boat may further include a top having a top surface and extending vertically from a center point of the self-draining sole such that the top aligns overhead of the console. The pump-out boat may further include a solar panel disposed on the top surface of the top for absorbing sunlight to convert into electrical power. The pump-out boat may further include a pump disposed within the console. The pump-out boat may further include at least one battery disposed within the hull and underneath the self-draining sole, the at least one battery being electrically connected to the at least one outboard motor, the pump, and the solar panel, such that the solar panel charges the at least one battery to provide the electrical power to operate the pump and the at least one outboard motor.

One or more of the following example features may be included. The boat hull may be composed of aluminum. An additional solar panel may be disposed on the stern of the boat hull. Six 24v dc 200AH Lithium-Ion batteries may be wired in series-parallel to achieve a 48v dc 600AH battery bank. The holding tank may have a capacity of at least 400 gallons. The top may be composed of at least a hydrophobic material, wherein the hydrophobic material may include at least one of plastic, wood, and vinyl.

In another example implementation, a solar electric pump-out boat for removing human waste may include, but is not limited to a boat hull, wherein the boat hull may include a bow, a stern, and a sole disposed therein. At least one motor may be disposed on the stern for powering movement of the pump-out boat. A holding tank may be disposed within the hull underneath the sole for collecting a liquid. A console may be on a top surface of the sole. At least one solar panel may be disposed on the pump-out boat for absorbing sunlight to convert into electrical power. A pump may be disposed on the pump-out boat. At least one battery may be disposed on the pump-out boat, the at least one battery being electrically connected to the pump and the solar panel, such that the solar panel charges the at least one battery to provide the electrical power to operate the pump.

One or more of the following example features may be included. The at least one battery may be further electrically connected to the at least one motor, and wherein the electricity generated by the solar panel may further power operation of the at least one motor. The console may be disposed approximately center and on a top surface of the sole. The sole may be self-draining. The pump may be disposed within a forward end of the console. The pump may be disposed behind the console. The pump may be a Rotho Model M-34, 1 hp 48v dc motor. The at least one motor may include an outboard motor. The liquid may include human waste. A top having a top surface and extending vertically from a center point of the sole may be included such that the top aligns overhead of the console. The at least one solar panel may be disposed on the top surface of the top. The at least one battery may be disposed on the pump-out boat within the hull and underneath the sole. The top may be a bimini top. An additional solar panel may be disposed on the stern of the boat hull.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings may indicate like elements.

DETAILED DESCRIPTION

Generally, environmental regulations may require, e.g., boat owners, to dispose of human waste collected within their hulls in a manner that is up to code and environmentally conscious. Notably, there are federal and state "no discharge" areas throughout the country, such as Long Island Sound. This helps prevent the dumping of such waste and sewage into waterways. As such, recreational boats may either dispose of their collected waste at designated pump out stations (typically located at fuel docks), or through gas powered pump-out service boats that are capable of driving out to the boat to be emptied.

While these gas powered pump-out boats present advantages to boat owners from accessibility and antiseptic standpoints, they may simultaneously present several disadvantages ranging from, e.g., high greenhouse gas emissions, high levels of noise pollution, and high operation costs. Research has revealed that a conventional gas powered pump-out boat emits approximately 17 pounds of carbon dioxide for each holding tank it pumps out—about equivalent to the levels of carbon dioxide released by driving a car with an average fuel efficiency of 25 miles per gallon for 23 miles.

Ironically, these conventional gas powered vessels designed to prevent pollution are contributors to pollution themselves.

Since the year 2000, over 8 million gallons of boating sewage has been pumped out of recreational vessels in the state of Connecticut alone. These numbers demonstrate the high usage of conventional gas powered pump-out boats in high traffic areas, and simultaneously indicates the large amounts of gas (and resultant expulsion of greenhouse gasses into the atmosphere) used to maintain operation of these pump-out boats over time. Pollution has been known to affect all species and is commonly defined as the presence in or introduction into the environment of a substance or thing that has harmful or poisonous effects.

Some studies show that carbon emissions from human activity account for approximately 65%-76% of the greenhouse gases present in the Earth's atmosphere, which may be contributing to increases in the Earth's temperature. There are approximately 12 million recreational boats currently in operation in the United States alone, and their combined use emits at least as much carbon dioxide per year as the operation of 1.3 million cars. Furthermore, sound pollution has been documented to affect mammals, fish, and invertebrate species whenever it has been examined. Several studies have observed the effects and responses to noise in marine mammals and found that effects of noise can range from mild responses (change in vocalizations, respiration, swim speed and foraging behavior) to lethal consequences (population displacement, elimination of population members and decreased reproduction). At smaller ports and marinas, though marine sound pollution is directly related to boat motors, little has been (or can be) done to ameliorate its effects.

In addition, sound pollution from boat motors is known to affect whales, crabs, and eels behavior and the physiology of fish embryos. Alleviating sound pollution is one management strategy that can affect marine environments positively. The impact of sound pollution has been documented to affect mammals, fish and invertebrate species whenever it has been examined (e.g., effects of noise on marine mammals can range from mild responses (change in vocalizations, respiration, swim speed and foraging behavior) to lethal consequences (population displacement, elimination of population members and decreased reproduction). In fish, noise has been documented to increase the heart rate of juveniles, and in invertebrates, noise has been documented to increase the heart rates of mussels, and increase shelter seeking and decrease the foraging time in Carcinus maenus. Compared to other types of "pollution" sound pollution has been little studied, yet has been documented to have negative effects on marine communities.

As such, as will be discussed below, the present disclosure may, e.g., provide a pump-out boat powered by electricity that is at least partially generated via solar panels, provide a pump-out boat with lower overall operation costs, provide a pump-out boat that emits noise at lower overall decibel levels, provide a pump-out boat that maximizes energy efficiency and onboard battery capacity without sacrificing maneuverability and ease of use, and/or provide a solar electric pump-out boat that emits as little as, e.g., 1.5 pounds of carbon dioxide per pump-out. Additionally, as will be discussed below, sound levels and marine life protection really separates the present disclosure from other traditional gasoline powered vessels. In addition, the vessel has a reduced "human impact" as the sound levels (noise pollution) impact boaters during pump-out service, and there is no exhaust fumes entering the cabins/living spaces of the the surrounding docked recreational vessels. These exhaust exposures are both mentally/socially disruptive and considered a mode of transmission and explosive to expelled caragenic fossil fuels).

As discussed above and referring also at least to the example implementations of FIGS. 1-5, a solar electric pump-out boat (e.g., pump-out boat 10) for removing human waste may include but is not limited to a boat hull (e.g., hull 11), wherein the boat hull may include a bow (e.g., bow 10a), a stern (e.g., stern 10b), and a sole (e.g., sole 12) disposed therein. At least one motor (e.g., motor 24) may be disposed on the stern for powering movement of the pump-out boat. A holding tank (e.g., holding tank 13) may be disposed within the hull underneath the sole for collecting a liquid. A console (e.g., console 14) may be on a top surface of the sole. At least one solar panel (e.g., solar panel 20) may be disposed on the pump-out boat for absorbing sunlight to convert into electrical power. A pump (e.g., pump 40) may be disposed on the pump-out boat. At least one battery (e.g., battery 22) may be disposed on the pump-out boat, the at least one battery being electrically connected to the pump and the solar panel, such that the solar panel charges the at least one battery to provide the electrical power to operate the pump.

As noted above, and referring also to FIGS. 1-5 (and respective views 100, 200, 300, 400, and configuration 500), in some implementations, a solar electric pump-out boat (e.g., pump-out boat 10) for removing human waste is shown. In some implementations, pump-out boat 10 may have a length overall ("LOA") of approximately 25 feet, although this length may vary without departing from the scope of the present disclosure.

In some implementations, pump-out boat 10 may include a boat hull (e.g., hull 11), wherein hull 11 may include a bow (e.g., bow 10a), a stern (e.g., stern 10b), and a sole (e.g., sole 12) disposed therein. In some example implementations, hull 11 may be formed as a moderate dead rise V bottom chine hull, with a full-shouldered V bow. In some implementations, hull 11 may be composed of aluminum. However, it will be appreciated that other materials and combinations of materials may also be used without departing from the scope of the present disclosure (e.g., epoxy, polyester, vinylester and some kind of fiber cloth such as fiberglass, kevlar, dynel, carbon fiber, etc.). In some implementations, sole 12 may be self-draining (e.g., via transom 15) and may be disposed within hull 11. In some implementations, a holding tank (e.g., holding tank 13) may be disposed within the hull underneath sole 12 (interior floors) for collecting a liquid (e.g., via a pump discussed further below). In some implementations, the hull may be specifically designed as a displacement hull, rather than a planing hull (e.g., moves water away, with little propulsion and reduces drag) to allow for reduced horsepower. Specifically, the hull may be a purpose-built, aluminum workboat, with moderate dead rise V bottom and a full shouldered V bow. Weight displacement may be, e.g., approximately 6,800 lbs in light condition (about 1,800 lbs of which is for batteries); and 10,000 lbs with full tank. This design may be beneficial to handle sea conditions such as pitching and rolling to maintain properly buoyant in fluctuating conditions to include variable weight distribution. It should be noted, that the hull may maintain essentially level trim over the full range of empty to full tank loads, as the aluminum hull weight of a 26 ft LOA (length overall) boat, design included added processes of sheet rolling, welding, and bolting to ensure longevity and strength stabilization.

This may allow the vessel longer operational time and reduces energy use. In some implementations, the liquid may include human waste (e.g., collected from boat lavatories). However, it will be appreciated that other liquids, such as gas, oil, water, etc. may also be collected (even if in a different holding tank). In some implementations, holding tank 11 may have a capacity of at least 400 gallons, but it will be appreciated that the capacity may vary without departing from the scope of the present disclosure.

In some implementations, at least one motor (e.g., motor 24) may be disposed on the stern for powering movement of the pump-out boat on top of the water (e.g., lake, pond, ocean, etc.). In some implementations, motor 24 may include an outboard motor, such as a 2×4 hp electric outboard 48v dc, or a 4.0 outboard motor. It will be appreciated that other types of motors, as well as engines if needed for backup purposes, may be used without departing from the scope of the present disclosure.

In some implementations, a console (e.g., console 14) may be on a top surface of the sole. For example, in some implementations, console 14 may be disposed approximately center and on a top surface of sole 12, extending perpendicularly from sole 12. However, it will be appreciated that console 14 may be located anywhere that is appropriate. A control panel (e.g., color, LCD, etc.) and/or relays for motor 24 and pump 40 may further be disposed on console 14. Notably, because pump-out boat 10 has a holding tank of 400 gallons, and the batteries weight is significant, the console must need to be balanced with a full and empty holding tank and during rough seas. This balancing makes the difference between a high efficiency vessel and an under-performing vessel (such as gas powered vessels), and without it may also mean the vessel will capsize in significant weather/marine conditions. The hull research and design played a major role in balancing pump-out boat 10 in all situations. In some implementations, open space may be provided completely around the periphery of console 14 to allow for the proper handling of dock lines and/or hoses, etc.

In some implementations, a roof or top (generally referred to interchangeably as top 16) may be included, where, in some implementations, top 16 may be a bimini top (e.g., metal frame which supports a canvas that is open on the sides). In some implementations, top 16 may extend vertically from a substantially central point of sole 12, such that top 16 substantially aligns overhead of console 14. In some implementations, top 16 may be composed of at least a hydrophobic material, wherein the hydrophobic material may include at least one of plastic, wood (e.g., treated wood), vinyl, or other umbrella type fabric. It will be appreciated that top 16 may be made of an common materials typically associated with bimini tops or boat roofs.

Figure 1:
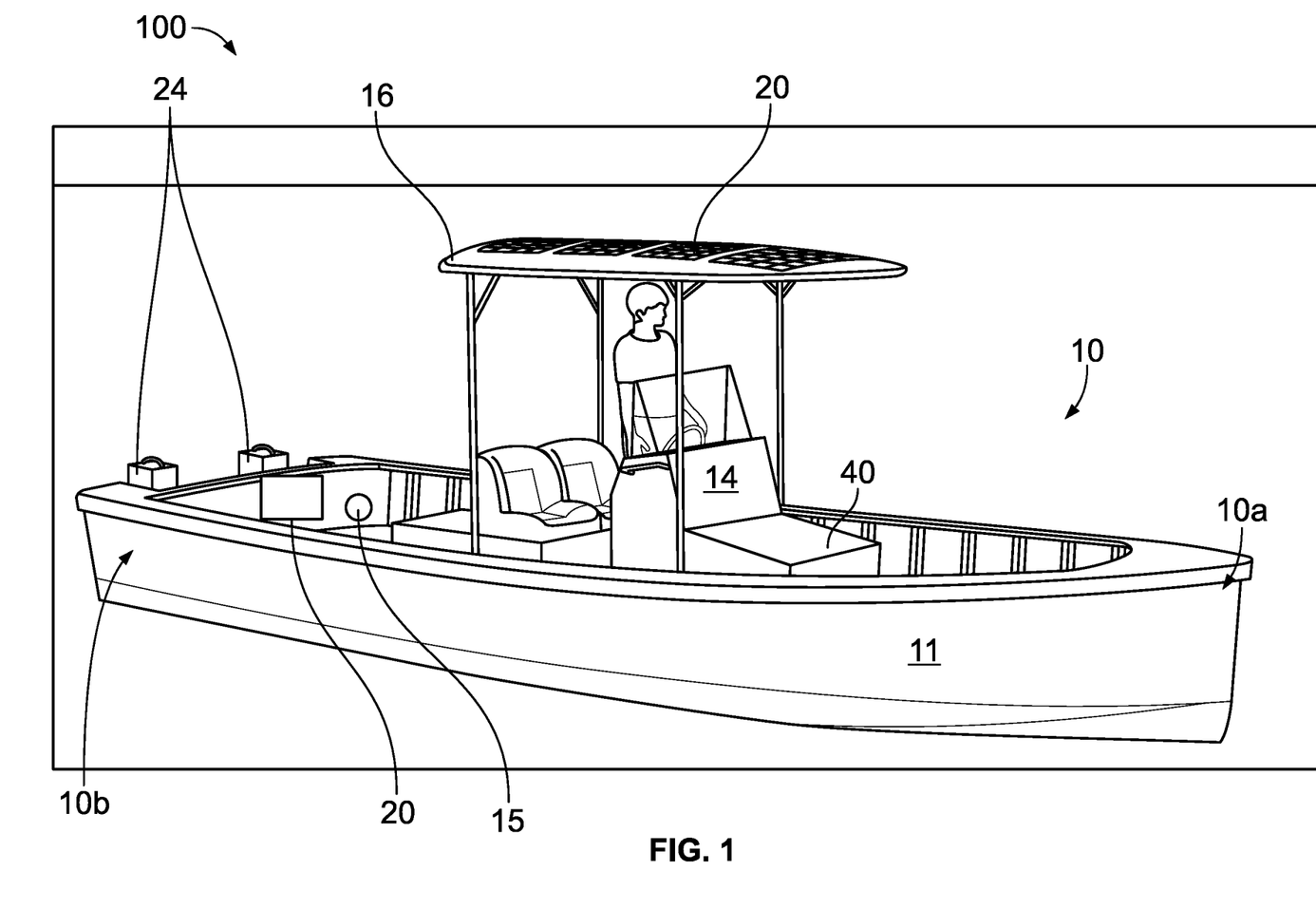
FIG. 1 is an example diagrammatic view of a side perspective view of a solar powered pump-out boat according to one or more example implementations of the disclosure.
Figure 2:
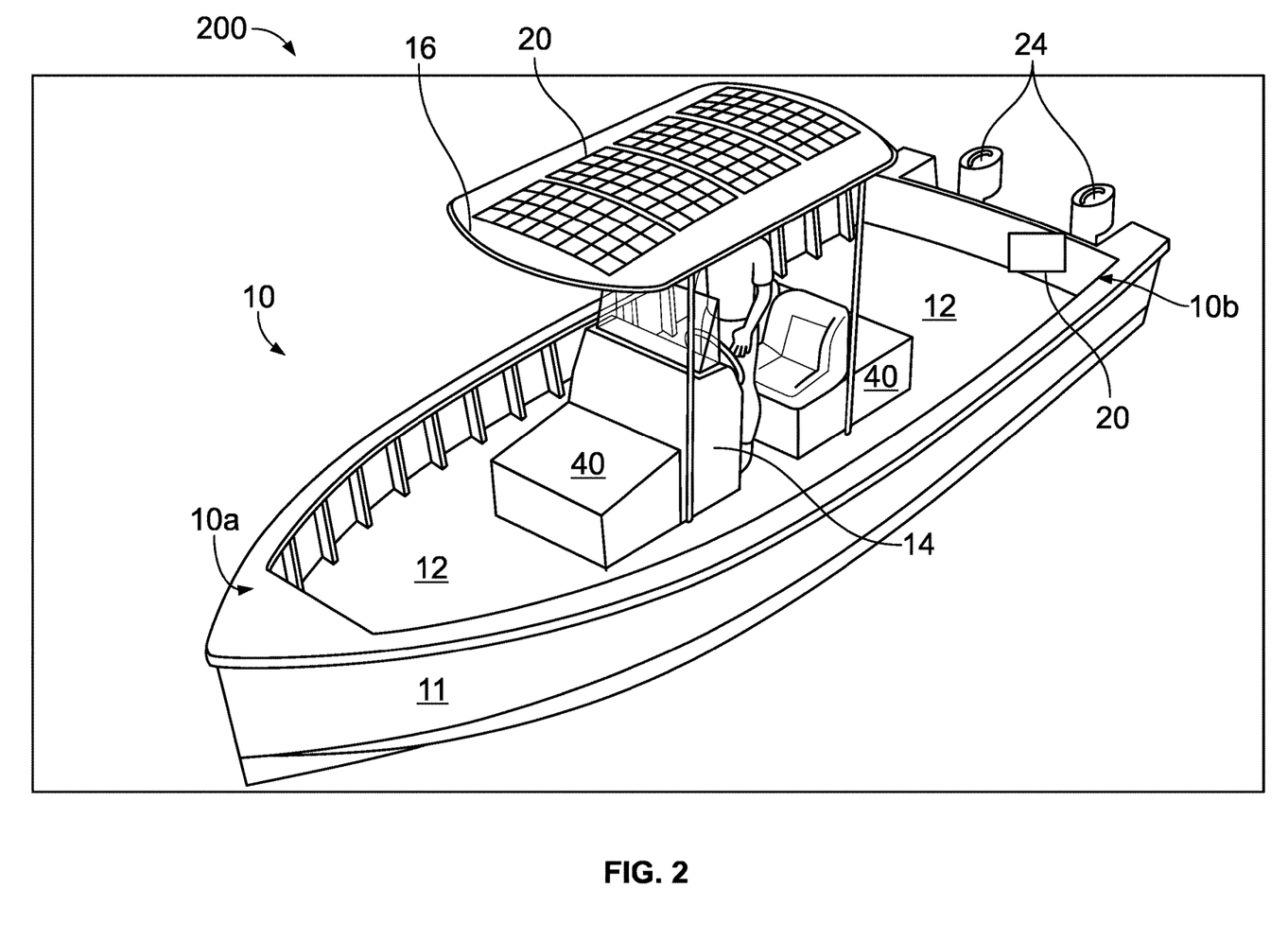
FIG. 2 is an example diagrammatic view of a top perspective view of a solar powered pump-out boat according to one or more example implementations of the disclosure.
Figure 3:
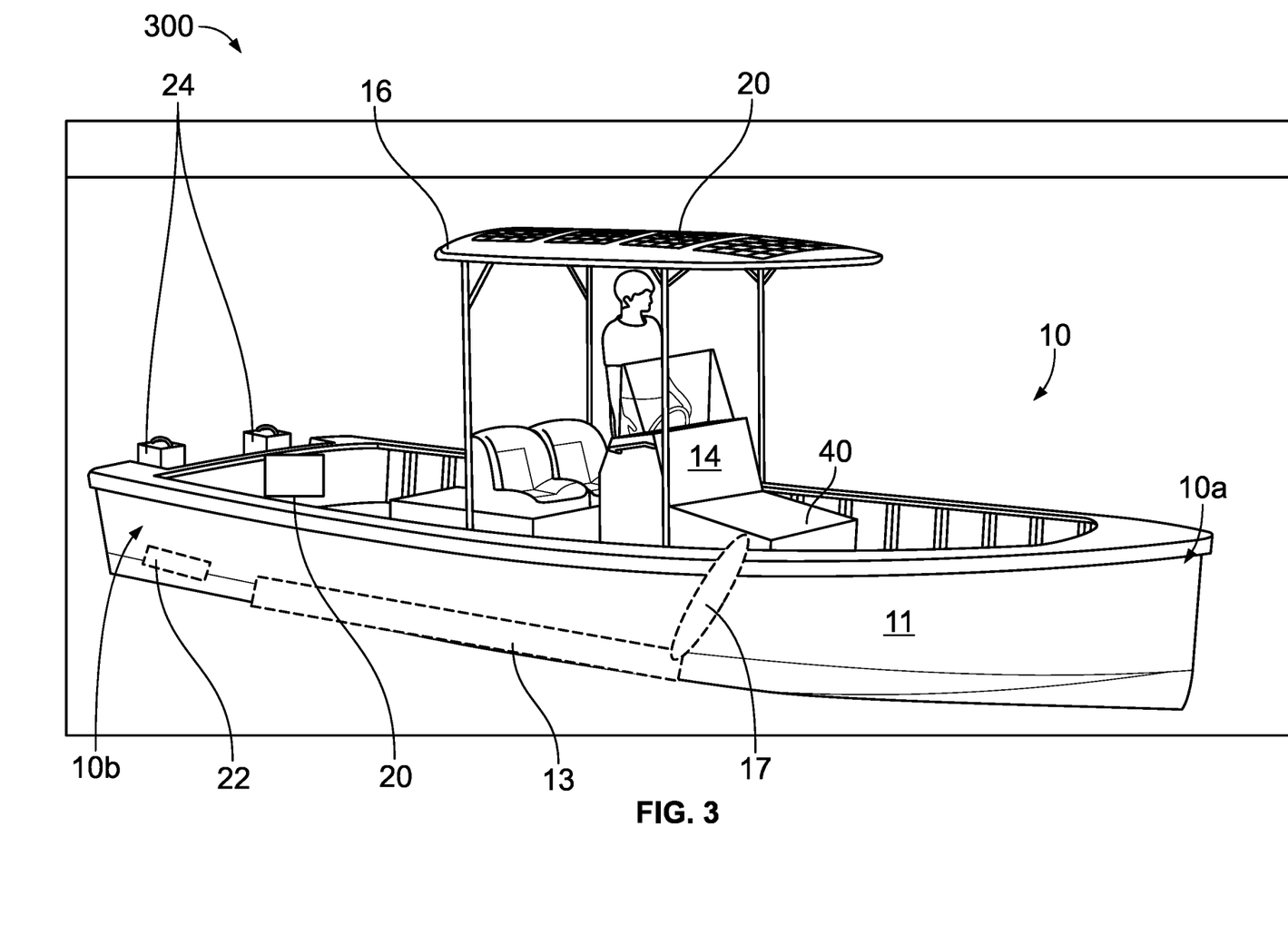
FIG. 3 is an example diagrammatic view of a side cross-sectional perspective view of a solar powered pump-out boat according to one or more example implementations of the disclosure.
Figure 4:
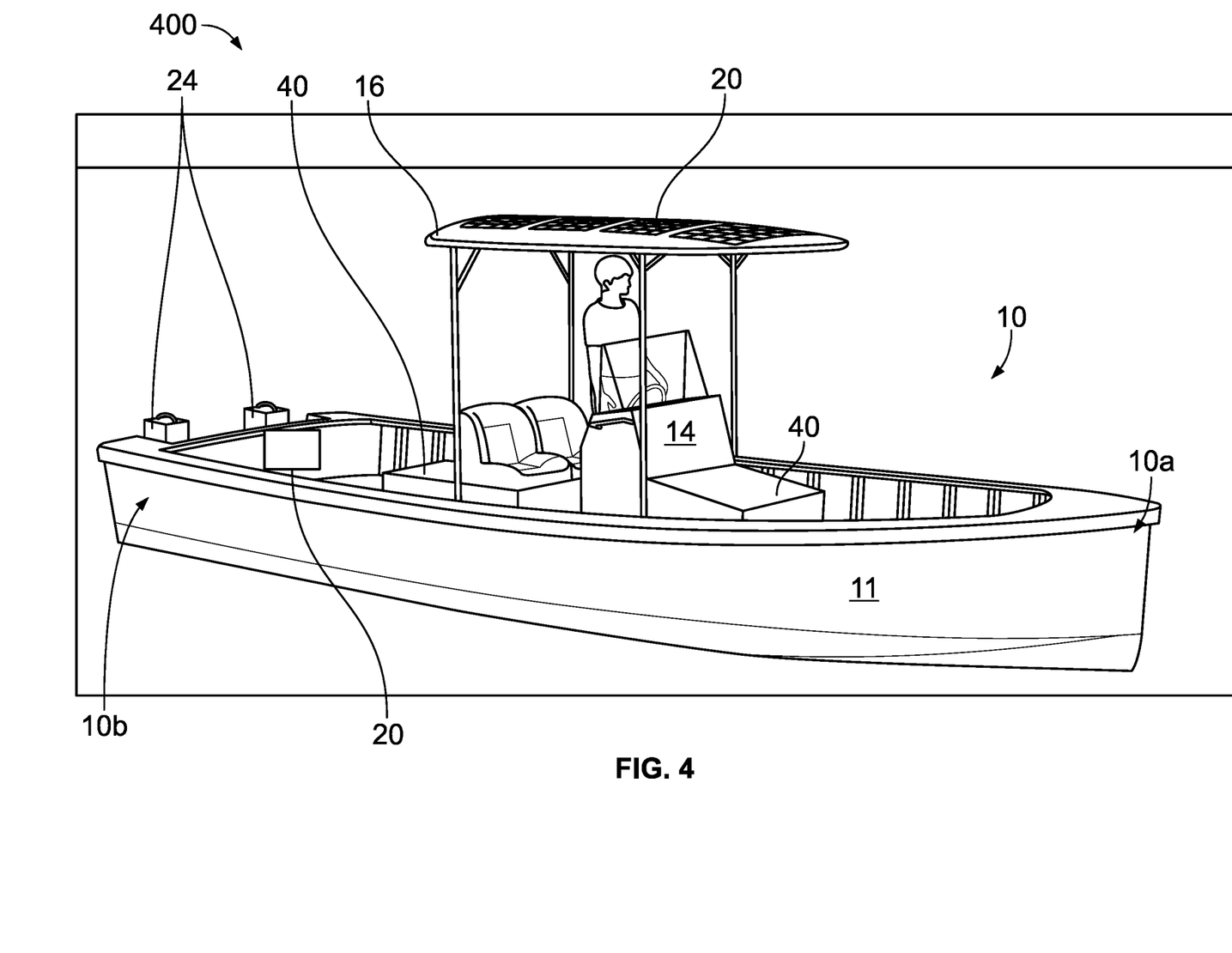
FIG. 4 is an example diagrammatic view of a side perspective view of a solar powered pump-out boat according to one or more example implementations of the disclosure.

In some implementations, a pump (e.g., pump 40) may be disposed on the pump-out boat. For instance, in some implementations, pump 40 may be disposed within a forward end of console 14 (shown in at least FIG. 2), and in some implementations, pump 40 may be disposed behind console 14 (i.e., behind the boat's operator) (shown in at least FIG. 2) and/or within a forward end of console 14 (as shown in FIG. 4). Pump 40 may be used as the mechanical device that retrieves, or sucks out and empties the waste (sewage) from other boat's holding tanks via a discharge hose (e.g., hose 17), which is then placed into holding tank 13 of pump-out boat 10. The discharge hose feeds holding tank 13 from the head and empties into the top of holding tank 13. The pump-out hose allows one to use a pump-out facility (and in the case of the present disclosure, pump-out boat 10), to pull from the bottom of the non-pump-out boat's holding tank, so that the waste may be placed into pump-out boat's holding tank 13. In some implementations, the pump may be a Rotho Model M-34, 1 hp 48v dc motor. However, it will be appreciated that other pumps may be used without departing from the scope of the present disclosure. Additionally/alternatively, gas and/or electric powered hybrid pumps may be used when necessary.

In some implementations, at least one solar panel (e.g., solar panel 20) may be disposed on the pump-out boat for absorbing sunlight to convert into electrical power, and in some implementations, solar panel 20 may be disposed on the top surface of top 16. For example, solar panel 20 may be disposed on the top planar surface of top 16 to provide maximum exposure to sunlight. In some implementations, an additional solar panel may be disposed on the stern of hull 11. For example, at least one additional solar panel 20 may further be disposed on the aft (rear) portion, or stern 10b of pump-out boat 10. Example solar panels 20 may be 8×100 W, 12v flexible solar panels, however, it will be appreciated that solar panels with varying sizes and specifications may also be used without departing from the scope of the present disclosure.

Figure 5:
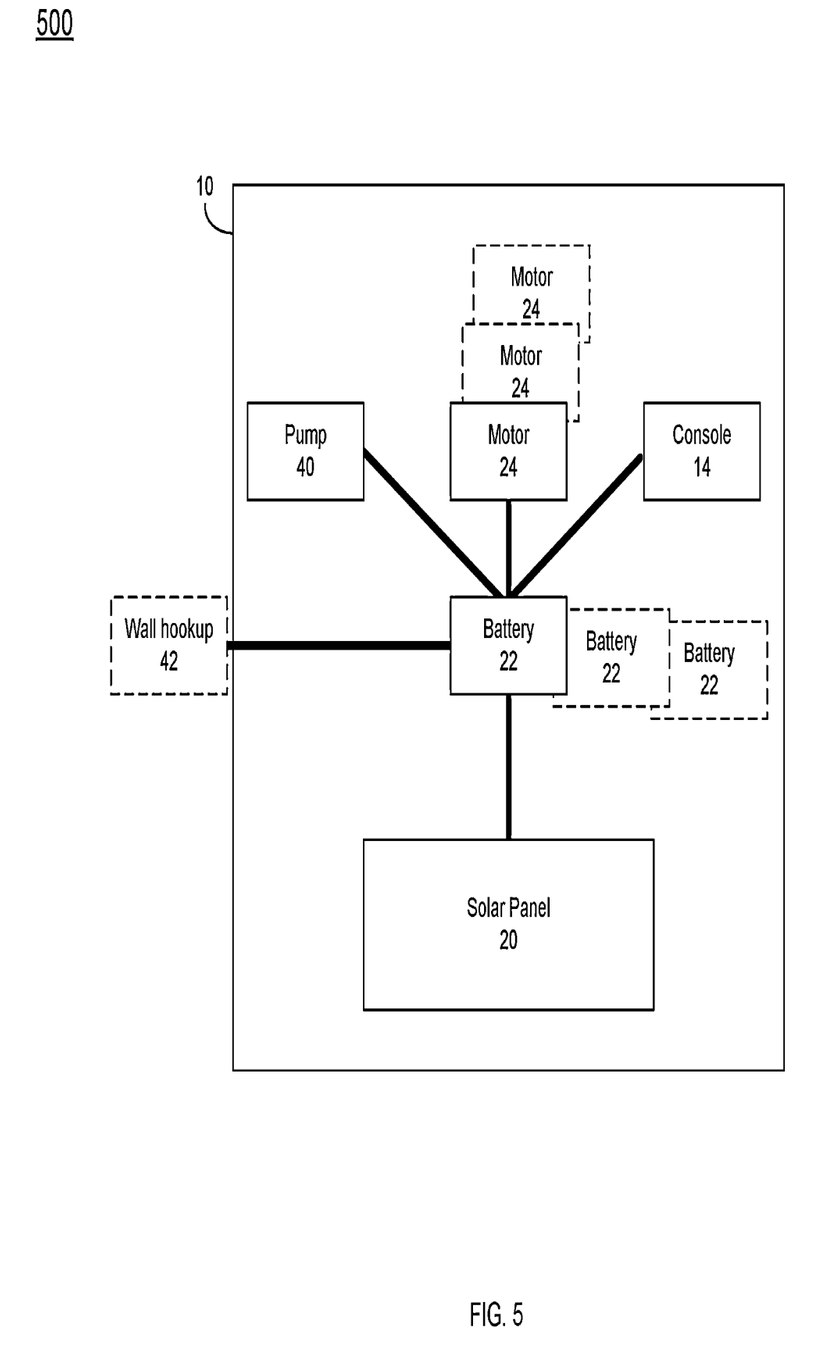
FIG. 5 is an example diagrammatic view of an electrical configuration of a solar powered pump-out boat according to one or more example implementations of the disclosure.

In some implementations, at least one battery (e.g., battery 22) may be disposed on pump-out boat 10, where battery 22 may be electrically connected to, e.g., pump 40 and solar panel 20, such that solar panel 20 charges battery 22 to provide the electrical power (stored in battery 22) to operate pump 40, and in some implementations, battery 22 may be further electrically connected to motor 24, wherein the electricity generated by solar panel 20 (and stored in battery 22) may further power operation of motor 24. An example electrical configuration 500 showing the connections of solar panel 20 with battery 22, pump 40, motor 24, as well as console 14, is shown in FIG. 5. It will be appreciated that other auxiliary components and devices may also be connected to battery 22 without departing from the scope of the present disclosure. In some implementations, in addition to the solar panel, battery, and motor configurations described throughout, distributor blocks that split a primary power cable into a number of secondary circuits and provide a fixed tap-off point may be used for system input and output. In some implementations, a pump-out boat 10 may be designed to cool and vent the batteries, especially given the extreme temperate variations (within a day or seasonal fluctuations to include current non-traditional climate trends), high-moisture/humidity, salt water operating environment. The lithium-ion batteries may be fully below an elevated, self-draining sole, and with specially designed and positioned vents throughout the specially designed displacement hull that were installed to protect, cool, and maintain low moisture levels for maximum battery performance.

A color control panel and relays for motor 24 and pump 40 may further be disposed on console 14. In general, and in some implementations, the electrical circuits may be sized and fused to meet or exceed guidelines, such as the American Boat and Yacht Council guidelines. In some implementations, pump-out boat 10 may need to run for, e.g., 10-12 hours per day without access to electrical support. Therefore, solar-electric pump-out boat 10 may be needed to operate in sunny and cloudy conditions to run all power needs—electronics, engines and a waste pump to both pull human sewage from recreational boats and off (pull) sewage from its own holding tank to an approved land-based waste water treatment plant. It should be noted that waste pumps require a significant amount of energy to properly operate and is used throughout an operational day as this is the main function of a pump-out vessel.

Solar panels mounted on the boat convert sunlight into electricity that is stored in batteries housed onboard. Energy from the batteries drives the propeller of an outboard electric motor. The energy output of the solar cells mounted to a solar-electric boat can vary widely, with maximum outputs ranging from a few hundred watts to several dozen kilowatts. The energy output of a solar panel is directly proportional to (1) the intensity of the sunlight it receives and (2) the size of the panel, as measured by surface area. The surface area-dependent energy output of a solar panel places some nontrivial constraints on the design and construction of a solar-electric boat; unless custom-built for the specific purpose of complete solar autonomy, the upper deck of a boat rarely has sufficient surface area to generate the electricity needed to propel the boat exclusively on solar power, even in intense sunlight. More commonly, the batteries of electric boats are charged by drawing electricity from conventional sources (i.e. the land-based electrical grid), and make use of boat-mounted solar panels to supply supplemental energy to the motor while on the water.

In some implementations, battery 20 may be disposed within hull 11, underneath sole 12, and adjacent to the holding tank 13. In some implementations, battery 22 may include, e.g., six 24v dc 200AH Lithium-Ion batteries wired in series-parallel to achieve, e.g., a 48v dc 600 AH battery bank. However, it will be appreciated that various other wiring configurations, voltages, and number of batteries may be used without departing from the scope of the present disclosure. In some implementations, battery 22 may further be recharged with electricity supplied through a land-based "shore power" hookup 42 connected to a main power grid.

As such, solar panel 20 may absorb sunlight and convert it into energy needed to charge battery 22 (and/or directly power electrically connected components without battery 22). In some implementations, the conversion to electricity as a primary power source may allow pump-out boat 10 to emit as little as, e.g., 1.5 pounds of carbon dioxide per pump-out—a 90% improvement over the conventional gas powered pump-out boats. Another unexpected but non-limiting advantage of this conversion may be the ability of pump-out boat 10 to operate in a manner that emits substantially fewer decibels on average when compared to conventional gas powered pump-out boats.

In some implementations, pump-out boat 10 may further be configured with standard deck and safety equipment, including, but not limited to: fire extinguishers, flotation devices, boarding ladders, marine radios, LED navigation lights, bilge pumps, anchors, dock lines, cleats, gunwale guards, access hatches, solar vents, etc.

Thus, the present disclosure may provide one or more of the following example and non-limiting advantages: 1) a solar electric pump-out boat capable of operating with lower overall operation costs (e.g., as a traditional gasoline marine engine runs on fossil fuel and require regular maintenance, whereas a solar-electric motor only has a few moving parts and does not require regular fuel fill-ups and engine maintenance, such as oil and fluid changes, spark plugs, winterization, etc); 2) a solar electric pump-out boat that operates in a manner that emits substantially fewer decibels on average; 3) a solar electric pump-out boat that maximizes energy efficiency and onboard battery capacity without sacrificing maneuverability and ease of use (e.g., operating in tight situations like marines and docks, in high wind and strong current conditions).; 4) a solar electric pump-out boat which operates in a manner that emits substantially fewer pounds of carbon dioxide on average when compared to conventional gas powered means; and 5) a solar electric pump-out boat that is capable of self-recharging through the use of solar panels.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A solar electric pump-out boat, comprising:
a boat hull, wherein the boat hull includes a V shaped bow, a stern, and a self-draining sole disposed therein, and wherein the boat hull is formed as a dead rise V bottom chine hull;
at least one outboard motor disposed on the stern for powering movement of the pump-out boat;
a holding tank disposed within the hull underneath the self-draining sole for collecting waste, the holding tank configured to receive waste from an external source and selectively discharge the waste therefrom;
a console disposed approximately center of, and on a top surface of the self-draining sole;
a top having a top surface and extending vertically from a center point of the self-draining sole such that the top aligns overhead of the console;
a solar panel disposed on the top surface of the top for absorbing sunlight to convert into electrical power;
a pump disposed within the console and above the self-draining sole, the pump configured to selectively pump the waste into and out of the holding tank; and
at least one battery disposed within the hull and underneath the self-draining sole, the at least one battery being electrically connected to the at least one outboard motor, the pump, and the solar panel, such that the solar panel charges the at least one battery to provide the electrical power to operate the pump and the at least one outboard motor.

2. The solar electric pump-out boat of claim 1 wherein the boat hull is composed of aluminum.

3. The solar electric pump-out boat of claim 1 further comprising an additional solar panel disposed on the stern of the boat hull.

4. The solar electric pump-out boat of claim 1 wherein the at least one battery includes six 24v dc 200AH Lithium-Ion batteries wired in series-parallel to achieve a 48v dc 600AH battery bank.

5. The solar electric pump-out boat of claim 1 wherein the holding tank has a capacity of at least 400 gallons.

6. The solar electric pump-out boat of claim 1 wherein the top is composed of at least a hydrophobic material, wherein the hydrophobic material includes at least one of plastic, wood, and vinyl.

7. The solar electric pump-out boat of claim 1 wherein the pump is disposed within one of a forward end of the console and a rear end of the console.

8. The solar electric pump-out boat of claim 1 wherein the pump is a 1 hp 48v dc motor.

9. The solar electric pump-out boat of claim 1 wherein the at least one outboard motor includes electric motor.

10. The solar electric pump-out boat of claim 1 wherein the liquid includes human waste.

11. The solar electric pump-out boat of claim 1 wherein the top is a bimini top.

* * * * *